(12) United States Patent
Kitagawa et al.

(10) Patent No.: US 6,847,791 B2
(45) Date of Patent: Jan. 25, 2005

(54) IMAGE FORMATION CONTROLLING METHOD AND IMAGE FORMING APPARATUS

(75) Inventors: Takashi Kitagawa, Yamatokooriyama (JP); Kaori Dakeshita, Goze (JP); Toshiaki Ino, Souraku-gun (JP); Takayuki Yamanaka, Nara (JP); Eiichi Kido, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 4 days.

(21) Appl. No.: 10/626,059

(22) Filed: Jul. 23, 2003

(65) Prior Publication Data

US 2004/0208661 A1 Oct. 21, 2004

(30) Foreign Application Priority Data

Aug. 30, 2002 (JP) ........................................ 2002-255976

(51) Int. Cl.⁷ .............................................. G03G 15/00
(52) U.S. Cl. ......................................................... 399/49
(58) Field of Search ............................... 399/49, 60, 74

(56) References Cited

U.S. PATENT DOCUMENTS 5,083,160 A * 1/1992 Suzuki et al.
5,697,011 A * 12/1997 Kobayashi et al. ............ 399/74
6,006,047 A * 12/1999 Mara et al. .................... 399/49
6,223,007 B1 * 4/2001 Kitagawa et al. .............. 399/49
6,519,425 B2 * 2/2003 Fischer .......................... 399/49
6,785,480 B2 * 8/2004 Toyohara et al. .............. 399/49

FOREIGN PATENT DOCUMENTS

| JP | 02-256076 | 10/1990 | |
| JP | 03-092874 | 4/1991 | |
| JP | 07306555 A | * 11/1995 | .......... G03G/15/00 |
| JP | 2000-122360 | 4/2000 | |
| JP | 2001-100481 | 4/2001 | |
| JP | 2002-169345 | 6/2002 | |

* cited by examiner

*Primary Examiner*—Susan Lee
(74) *Attorney, Agent, or Firm*—David G. Conlin; David A. Tucker; Edwards & Angell, LLP

(57) ABSTRACT

Before replacement of constituent parts of an image density sensor or of other image forming units, the image density of a formed test toner patch image is detected by the image density sensor and conditions for image formation are controlled. After replacement of the constituent parts, the image density sensor detects the image density of a test toner patch image which is formed based on the controlled conditions for image formation. The optical output and/or the optical sensitivity is adjusted so that a detected value becomes a predetermined reference value, to calibrate the image density sensor. With this image formation controlling method, the image density sensor can be calibrated easily and precisely, the image density of a toner pattern image can be held proper and a stable high-quality image can be obtained.

10 Claims, 9 Drawing Sheets

IMAGE FORMATION CONTROLLING METHOD AND IMAGE FORMING APPARATUS

BACKGROUND OF THE INVENTION

1. Field of the Invention

The present invention relates to an image formation controlling method comprising a step of calibrating (adjusting) an image density sensor for detecting the image density of a toner pattern image of each color, which is formed on a photoconductor, an intermediate transfer member or a transfer member of an image forming apparatus such as a copying machine or a printer of various kinds, and to an image forming apparatus used for performing the image formation controlling method.

2. Description of Related Art

Since a photo type image forming apparatus forms an image using electrostatic force, the characteristic thereof is changeable in response to a change in conditions of each processing unit in use and conditions of surroundings. A change in characteristic may cause a change in the density of a formed image and deterioration of image quality. In order to avoid such a situation and to adjust image quality so as to keep obtaining preferable image quality, an image formation controlling step (a process control mode) is provided for adjusting (performing process control on) conditions for image formation (such as a charging output, a light exposure, a development bias voltage, a transfer bias voltage and the amount of toner supply (when two-component developer is used)) of each part of an image forming section.

The quality of an image is adjusted by forming a toner pattern image for a test on an image carrier such as a photoconductor, an intermediate transfer member (an intermediate transfer drum or an intermediate transfer belt) or a transfer member (a transfer drum or a transfer belt) at predetermined timing which is not involved in image formation, measuring the image density of the toner pattern image by an image density sensor configured as an optical sensor and controlling the above-mentioned conditions for image formation by feedback control based on the measured value.

The image density sensor has a light emitting device and a light receiving device and is constructed to emit light from the light emitting device toward the toner pattern image and detect light reflected at the toner pattern image by the light receiving device.

In recent years, an apparatus for forming a chromatic toner pattern image on the surface of an image carrier has been widely used. In such an image forming apparatus, a chromatic test toner pattern image is formed on the surface of an image carrier by a developing device and the amount of adhering toner is detected by an image density sensor. For detecting the amount of adhering toner precisely, a method for detecting a quantity of light diffusely reflected at a test toner pattern image has been proposed (in Japanese Patent Application Laid-Open No. 2000-122360, No. 2001-100481, No. 2002-169345, No. 2-256076 (1990), No. 3-92874 (1991) and the like). Different methods are used for measuring the density of a black (achromatic) toner pattern image and for measuring the density of a chromatic toner pattern image. The density of an achromatic toner pattern image is measured by measuring light (specular-reflection light) specularly reflected at a toner pattern image while the density of a chromatic toner pattern image is measured by measuring diffuse-reflection light as described above.

Since an image density sensor for a toner pattern image detects the quantity of light, which is emitted from a light emitting device and reflected at a toner pattern image, with a light receiving device, it is required to calibrate an optical characteristic of the image density sensor. That is, the amount of adhering toner cannot be detected precisely without calibrating the output of the image density sensor on the basis of a reference value corresponding to a constant amount of adhering toner.

Consequently, accurate calibration of an image density sensor using a jig or the like is performed at the time of manufacturing or assembling and in shipment.

On replacement of a sensor due to an end of the life of a sensor, a malfunction or the like, accurate calibration in the same manner is required again.

However, when a jig comprising a calibration plate for calibration is used, the jig has to be attached with high accuracy. Moreover, since the image density sensor is arranged in a considerably narrow space, it is difficult to attach a large-scale jig which requires accurate positioning. Such a state causes an increase in maintenance cost. Furthermore, on the assumption that user maintenance is performed, it is extremely difficult to perform accurate calibration in view of complication of a calibration operation.

In order to solve the above problems, a method is proposed to dispose a slidable calibration plate, so that the calibration plate is positioned to oppose a sensor when the sensor requires calibration while the calibration plate which is not in use is held back. There is, however, a problem that structure becomes complex because of installment of a sliding mechanism of the calibration plate. There is another problem that it is difficult to avoid contamination by toner due to long use in the image forming apparatus, which cause increase in maintenance cost.

BRIEF SUMMARY OF THE INVENTION

The present invention has been made with the aim of solving the above problems, and it is an object thereof to provide an image formation controlling method which does not require a calibration plate for calibrating an image density sensor so that contamination of a standing calibration plate by toner does not occur, and to an image forming apparatus used for performing the image formation controlling method.

Another object of the present invention is to provide an image formation controlling method for calibrating an image density sensor easily and precisely after replacement of parts of an image forming apparatus or when aging deterioration of performance of an image density sensor occurs, with which the image density of a toner pattern image can be held proper and a stable high-quality image can be obtained, and to an image forming apparatus used for performing the image formation controlling method.

Another object of the present invention is to provide an image formation controlling method for calibrating an image density sensor easily and precisely, with which color image density can be held proper, stable color balance can be held and a high-quality color image can be obtained.

Another object of the present invention is to provide an image formation controlling method for calibrating an image density sensor with high accuracy, with which color image density can be held proper and a more stable high-quality color image can be obtained.

Still another object of the present invention is to provide an image formation controlling method for calibrating an image density sensor with high accuracy, with which monochromatic image density can be held proper and a more stable high-quality monochromatic image can be obtained.

First in an image formation controlling method of the present invention, an electrostatic latent image is formed on a photoconductor by exposing the photoconductor, which is charged with electricity, to light. An image density sensor including light emitting means and light receiving means emits light onto a toner pattern image obtained by developing the electrostatic latent image or transferring the electrostatic latent image onto a transfer member. The image density of the toner pattern image is detected by detecting a quantity of light reflected at the toner pattern image. On the basis of the detected image density, one or a plurality of conditions for image formation, including a charging voltage for charging the photoconductor, a light exposure of the photoconductor, a development bias voltage to be applied for developing the electrostatic latent image, the amount of toner supplied for developing the electrostatic latent image and a transfer bias voltage to be applied for transferring the toner pattern image, are controlled. The image formation controlling method is characterized by including a calibration step of calibrating an image density sensor so that a detection value of image density of a toner pattern image, which is formed on the basis of the conditions for image formation controlled as above, becomes a predetermined reference value.

This image formation controlling method does not require a calibration plate for calibrating the image density sensor for detecting the quantity of light reflected at a toner pattern image, so that contamination of a standing calibration plate by toner does not occur.

Moreover, after replacement of one or a plurality of constituent parts of an image forming apparatus, such as an image density sensor, a photoconductor, an intermediate transfer drum or an intermediate transfer belt, and a transfer drum or a transfer belt, or when aging deterioration of performance of the image density sensor occurs, the image density sensor can be calibrated easily and precisely and the image density of a toner pattern image can be detected precisely irrespective of the state of the surface of the photoconductor, transfer member or the like.

Consequently, by controlling conditions for image formation reliably, the image density of a toner pattern image can be held proper and a high-quality image can be realized.

The image formation controlling method of the present invention may further comprise a step of forming chromatic toner pattern images of subtractive three principle colors, respectively, on the basis of the conditions for image formation controlled as above and a step of calibrating the image density sensor so that detection values of image density of the toner pattern images respectively become reference values.

This image formation controlling method does not require a calibration plate for calibrating the image density sensor, so that the image density sensor can be calibrated easily and precisely irrespective of the state of the surface of the photoconductor, transfer member or the like, color image density can be held proper, stable color balance can be held and a high-quality color image can be obtained.

In the image formation controlling method of the present invention, the image density of a chromatic toner pattern image may be detected on the basis of a quantity of diffusely reflected light.

This image formation controlling method does not require a calibration plate for calibrating the image density sensor, so that the image density sensor can be calibrated with high accuracy by detecting diffusely reflected light, color image density can be held proper and a more stable high-quality color image can be obtained.

In the image formation controlling method of the present invention, the image density of an achromatic toner pattern image may be detected on the basis of a quantity of specularly reflected light.

This image formation controlling method does not require a calibration plate for calibrating the image density sensor, so that the image density sensor can be calibrated with high accuracy irrespective of the state of the surface of the photoconductor, transfer member or the like, monochromatic image density can be held proper and a more stable high-quality monochromatic image can be obtained.

In the image formation controlling method of the present invention, the image density sensor may be calibrated by adjusting the quantity of light emitted from light emitting means, which is included in the image density sensor, for emitting light onto a toner pattern image.

With this image formation controlling method, the image density sensor can be calibrated easily and with high accuracy.

In the image formation controlling method of the present invention, the image density sensor may be calibrated by adjusting the optical sensitivity of light receiving means, which is included in the image density sensor, for receiving light emitted onto a toner pattern image.

With this image formation controlling method, the image density sensor can be calibrated easily and with high accuracy.

In the image formation controlling method of the present invention, the calibration step may be performed after replacement of one or a plurality of constituent parts of the image forming apparatus including the image density sensor and the photoconductor.

This image formation controlling method does not require a calibration plate which is conventionally required for calibrating an image density sensor after replacement of one or a plurality of constituent parts of the image forming apparatus, such as an image density sensor, a photoconductor and a transfer member, so that contamination of a standing calibration plate by toner does not occur.

Moreover, the image density sensor can be calibrated easily and with high accuracy irrespective of the state of the surface of the photoconductor, transfer member or the like, the image density of a toner pattern image can be held proper and a stable high-quality image can be obtained.

An image forming apparatus of the present invention first forms an electrostatic latent image on a photoconductor by exposing the photoconductor, which is charged with electricity, to light. An image density sensor including light emitting means and light receiving means emits light onto a toner pattern image obtained by developing the electrostatic latent image or transferring the electrostatic latent image onto a transfer member. After converting a current, which arises from light reflected at the toner pattern image and received, into a voltage, the image density of the toner pattern image is detected on the basis of an amplified value. On the basis of the detected image density, one or a plurality of conditions for image formation, including a charging voltage for charging the photoconductor, a light exposure of the photoconductor, a development bias voltage to be applied for developing the electrostatic latent image, the amount of toner supplied for developing the electrostatic latent image and a transfer bias voltage to be applied for transferring the toner pattern image, are controlled. This image forming apparatus is characterized by comprising means for changing the optical output of the light emitting means so that a value of image density of a toner pattern image, which is formed on the basis of the conditions for image formation controlled as above, becomes a predetermined reference value.

This image forming apparatus does not require a calibration plate for calibrating the image density sensor after replacement of constituent parts of the image forming apparatus, or when aging deterioration of performance of the image density sensor occurs, so that the image density sensor can be calibrated easily and precisely and the image density of a toner pattern image can be held proper irrespective of the state of the surface of the photoconductor, transfer member or the like. A stable high-quality image can thus be obtained.

An image forming apparatus of the present invention first forms an electrostatic latent image on a photoconductor by exposing the photoconductor, which is charged with electricity, to light. An image density sensor including light emitting means and light receiving means emits light onto a toner pattern image obtained by developing the electrostatic latent image or transferring the electrostatic latent image onto a transfer member. After converting a current, which arises from light reflected at the toner pattern image and received, into a voltage, the image density of the toner pattern image is detected on the basis of an amplified value. On the basis of the detected image density, one or a plurality of conditions for image formation, including a charging voltage for charging the photoconductor, a light exposure of the photoconductor, a development bias voltage to be applied for developing the electrostatic latent image, the amount of toner supplied for developing the electrostatic latent image and a transfer bias voltage to be applied for transferring the toner pattern image, are controlled. This image forming apparatus is characterized by comprising means for changing a resistance to be used for converting a current, which arises from light reflected at the toner pattern image and received by the light receiving means, into a voltage, and/or means for changing a gain to be used for amplification after converting the current into a voltage, so that a value of image density of a toner pattern image, which is formed on the basis of the conditions for image formation controlled as above, becomes a predetermined reference value.

This image forming apparatus does not require a calibration plate for calibrating the image density sensor after replacement of constituent parts of the image forming apparatus, or when aging deterioration of performance of the image density sensor occurs, so that the image density sensor can be calibrated easily and precisely and the image density of a toner pattern image can be held proper irrespective of the state of the surface of the photoconductor, intermediate transfer member, transfer member or the like. A stable high-quality image can thus be obtained.

The above and further objects and features of the invention will more fully be apparent from the following detailed description with accompanying drawings.

DETAILED DESCRIPTION OF THE INVENTION

Figure 1:
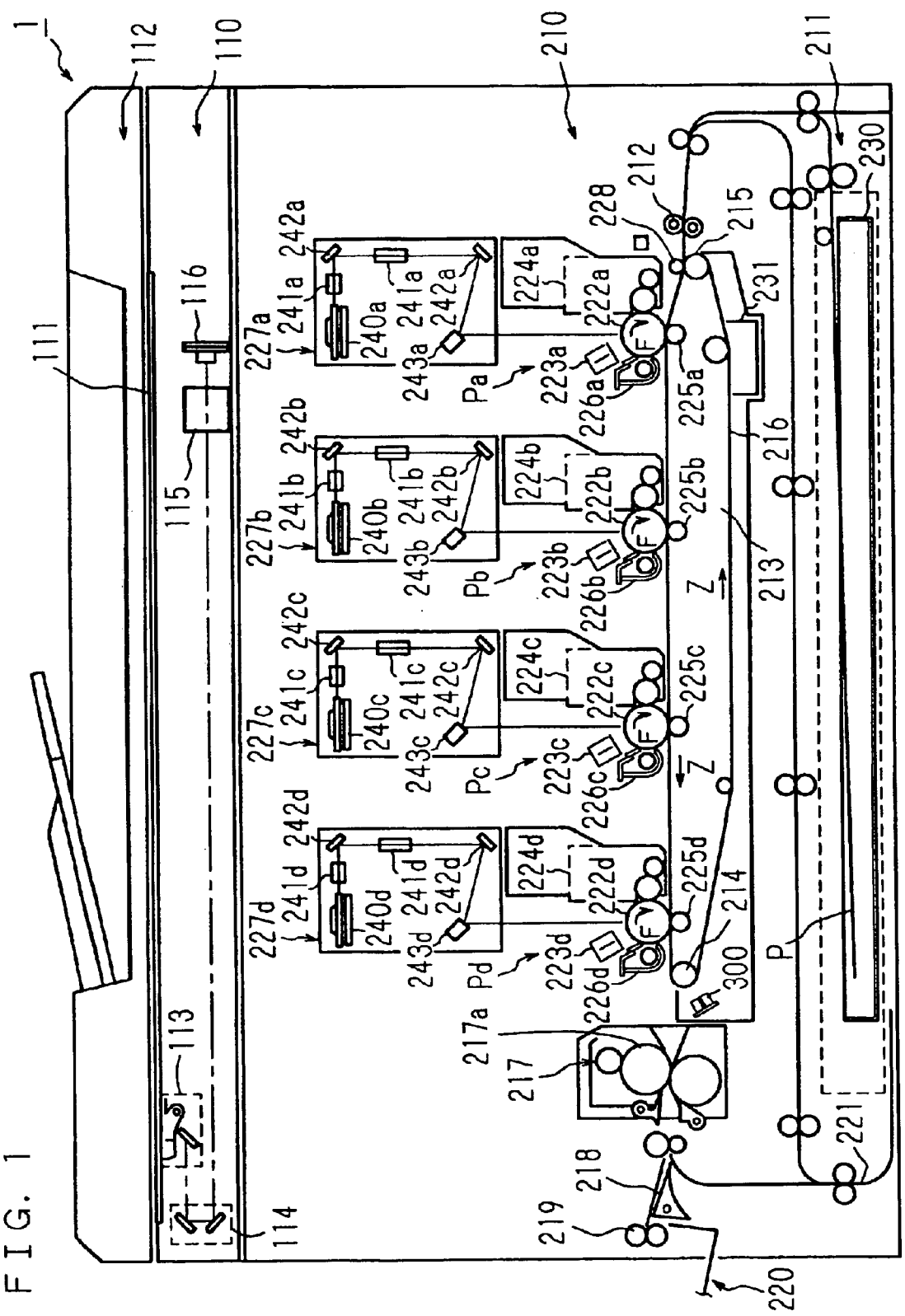
FIG. 1 is a schematic sectional front view showing the structure of a digital color copying machine which is an image forming apparatus according to an embodiment of the present invention.

FIG. 1 is a schematic sectional front view showing the structure of a digital color copying machine 1 which is an image forming apparatus according to an embodiment of the present invention.

A document table 111 and an operation panel are provided at an upper portion of the copying machine body 1. An image reader 110 and an image forming section 210 are provided in the copying machine body 1.

Mounted on an upper face of the document table 111 is a reversing automatic document feeder (RADF) 112 which is supported so as to have a predetermined positional relation with the document table 111 and so as to be opened and closed.

The reversing automatic document feeder 112 transports a document so that a face of the document opposes the image reader 110 at a predetermined position of the document table 111. After reading of an image on the face of the document is completed, the reversing automatic document feeder 112 reverses and transports the document so that the other face of the document opposes the image reader 110 at a predetermined position of the document table 111. After reading of images on both faces of one document is completed, the reversing automatic document feeder 112 discharges the original and performs transport operations of both faces of the next document.

Above-described operations for transporting and reversing a document are controlled in relation to the whole operations of the digital color copying machine 1.

The image reader 110 is arranged under the document table 111 to read an image of a document which is transported onto the document table 111 by the reversing automatic document feeder 112. The image reader 110 has a first scanning unit 113 and a second scanning unit 114 which are document scanning members capable of reciprocating in parallel along a lower face of the document table 111; an optical lens 115; and a CCD line sensor 116 consisting of a photoelectric conversion device.

The first scanning unit 113 has an exposure lamp for exposing the surface of a document image to light and a first mirror for deflecting an optical image reflected at a document into a predetermined direction, and reciprocates in parallel at a predetermined scanning speed in a state where a constant distance is kept between the first scanning unit 113 and the lower face of the document table 111. The second scanning unit 114 has a second mirror and a third mirror for further deflecting an optical image reflected at a document and deflected by the first mirror of the first scanning unit 113 into a predetermined direction, and reciprocates in parallel with a constant speed relation with the first scanning unit 113.

The optical lens 115 reduces the size of an optical image reflected at a document and deflected by the third mirror of the second scanning unit and images the optical image of reduced size at a predetermined position on the CCD line sensor 116.

The CCD line sensor 116 sequentially converts the imaged optical image into electric signals and outputs the electric signals. The CCD line sensor 116 is a three-line color CCD which can read a black and white image or a color image and output line data obtained by decomposing the image into color components of R (red), G (green) and B (blue). Document image information which is converted into electric signals by the CCD line sensor 116 is further sent to an image processor, which is not illustrated in figures, and undergoes a predetermined image data process.

The following description will explain the structure of the image forming section 210 and the structure of each part relating to the image forming section 210.

Provided under the image forming section 210 is a sheet feeding mechanism 211 for separating sheets (recording media) P, which are housed in a sheet tray 230 in piles, one by one and feeding each sheet toward the image forming section 210. Each of the sheets P which are fed after being separated one by one is transported to the image forming section 210 in timing controlled by a pair of resist rollers 212 which are arranged nearer to the sheet tray 230 than the image forming section 210. After an image is formed on a face of a sheet P, the sheet P is fed again to the image forming section 210 in timing matching with image formation by the image forming section 210.

Arranged under the image forming section 210 is a transfer and transport belt mechanism 213. The transfer and transport belt mechanism 213 is constructed to transport a sheet P in a manner that the sheet P is electrostatically adsorbed to a transfer and transport belt 216 which is suspended to extend between a drive roller 214 and a driven roller 215, approximately in parallel. A patch image detecting board unit 300 according to the present invention is provided in proximity to a downstream part of the transfer and transport belt 216 where a curvature of the belt is large.

Further arranged at a downstream side of the transfer and transport belt mechanism 213 along a sheet transport path is a fixer 217 for applying heat fusing of a toner image which is transferred to and formed on a sheet P. The sheet P which has passed a nip portion between a pair of fixing rollers 217a provided at the fixer 217 is transported through a transport direction switching gate 218 and is discharged by a discharging roller 219 onto a discharge tray 220 which is attached to an external wall of the body of the digital color copying machine 1.

Toner remaining on the transfer and transport belt 216 is removed by a cleaning unit 231.

The switching gate 218 switches a transport path of a sheet P after the fixing operation into either a path for discharging the sheet P to the body of the digital color copying machine 1 or a path for feeding the sheet P again toward the image forming section 210. A sheet P, a transport direction of which is switched again to the image forming section 210 by the switching gate 218, is reversed in a switchback transport path 221 and fed again to the image forming section 210.

Above the transfer and transport belt 216 of the image forming section 210, a first image forming station Pa, a second image forming station Pb, a third image forming station Pc and a fourth image forming station Pd are juxtaposed in this order from the upstream side to the down stream side of the sheet transport path, in proximity to the transfer and transport belt 216.

A drive roller 214 drives the transfer and transport belt 216 in a direction indicated by arrows Z in FIG. 1 by friction drive. The transfer and transport belt 216 holds a sheet P fed via the sheet feeding mechanism 211 as described above and transports the sheet P sequentially to the first, second, third and fourth image forming stations Pa, Pb, Pc and Pd.

The first, second, third and fourth image forming stations Pa, Pb, Pc and Pd have substantially the same structure. The first, second, third and fourth image forming stations Pa, Pb, Pc and Pd respectively include photoconductor drums (photoconductors) 222a, 222b, 222c and 222d which are driven to rotate in directions indicated by arrows F in FIG. 1.

Arranged around the photoconductor drums 222a, 222b, 222c and 222d sequentially in rotational directions of the photoconductors 222a, 222b, 222c and 222d are chargers 223a, 223b, 223c and 223d for charging respectively the photoconductor drums 222a, 222b, 222c and 222d uniformly; developing devices 224a, 224b, 224c and 224d for developing respectively electrostatic latent images formed on the photoconductor drums 222a, 222b, 222c and 222d; dischargers for transfer (transfer rollers) 225a, 225b, 225c and 225d for transferring developed toner images on the photoconductor drums 222a, 222b, 222c and 222d onto a sheet P; and cleaning devices 226a, 226b, 226c and 226d for removing toner remaining on the photoconductor drums 222a, 222b, 222c and 222d.

Arranged respectively above the photoconductor drums 222a, 222b, 222c and 222d are laser beam scanner units (LSUs) 227a, 227b, 227c and 227d. The LSUs 227a, 227b, 227c and 227d are composed of semiconductor laser devices (not illustrated in figures) for emitting dot light modulated in accordance with image data; polygon mirrors (deflecting devices) 240a, 240b, 240c and 240d for deflecting laser beams from the semiconductor laser devices into main scanning directions; fθ lenses 241, 241b, 241c and 241d for focusing laser beams deflected by the polygon mirrors 240a, 240b, 240c and 240d onto the surface of the photoconductor drums 222a, 222b, 222c and 222d; mirrors 242a, 242b, 242c and 242d; mirrors 243a, 243b, 243c and 243d; and the like.

Pixel signals corresponding to a black component image, a cyan component image, a magenta component image and a yellow component image of a color document image are inputted respectively into the LSUs 227a, 227b, 227c and 227d.

Electrostatic latent images corresponding to document image information converted to colors as above are formed on the photoconductor drums 222a, 222b, 222c and 222d.

The developing devices 224a, 224b, 224c and 224d respectively house black toner, cyan toner, magenta toner and yellow toner so that the electrostatic latent images on the photoconductor drums 222a, 222b, 222c and 222d are developed with toner of these colors. As a result, the document image information converted to colors by the image forming section 210 is reproduced as toner images of the respective colors.

A (brush) charger 228 for adsorbing a sheet is provided between the first image forming station Pa and the sheet feeding mechanism 211. The charger for adsorption 228 charges the surface of the transfer and transport belt 216 with electricity so that a sheet P fed from the sheet feeding mechanism 211 is transported from the first image forming station Pa to the fourth image forming station Pd without getting out of position, in a state where the sheet P is reliably adsorbed onto the transfer and transport belt 216.

For the digital color copying machine 1 constructed as above, cut sheets are used as the sheets P. When a sheet P is fed from the sheet tray 230 and supplied into a guide of a sheet transport path of the sheet feeding mechanism 211, an end portion of the sheet P is detected by a sensor (not illustrated in figures). On the basis of detection signals outputted from this sensor, a pair of resist rollers 212 stops the sheet P temporarily.

The sheet P is then transported onto the transfer and transport belt 216 which rotates in a direction of the arrows Z in timing matching with the respective image forming stations Pa, Pb, Pc and Pd. Here, since the transfer and transport belt 216 is charged with electricity in a predetermined degree by the charger for adsorption 228 as described above, the sheet P is transported and supplied through the respective image forming stations Pa, Pb, Pc and Pd in a stable manner.

At the respective image forming stations Pa, Pb, Pc and Pd, toner images of the respective colors are respectively formed so that the images are superposed on a supported face of a sheet P which is electrostatically adsorbed on and transported by the transfer and transport belt 216. When transfer of an image by the fourth image forming station Pd is completed, the sheet P is removed from the transfer and transport belt 216 by a discharger for eliminating electricity sequentially from an end thereof, and is then led to the fixer 217. Lastly, the sheet P on which toner images are fixed is discharged from a sheet discharging opening (not illustrated in figures) onto the discharge tray 220.

It should be noted that, although the above description explains a case where the LSUs 227a, 227b, 227c and 227d scan laser beams and expose the photoconductor drums 222 to light so as to write data on the photoconductor drums 222 with light, writing optical systems (LED heads) composed of, for example, light-emitting diode arrays and imaging lens arrays may be employed in place of the LSUs. An LED head has the advantage of having small size and not including any movable part, which may cause noise, over an LSU. Consequently, LED heads can be preferably used in an image forming apparatus such as a digital color copying machine of tandem type which requires a plurality of optical writing units.

Figure 2:
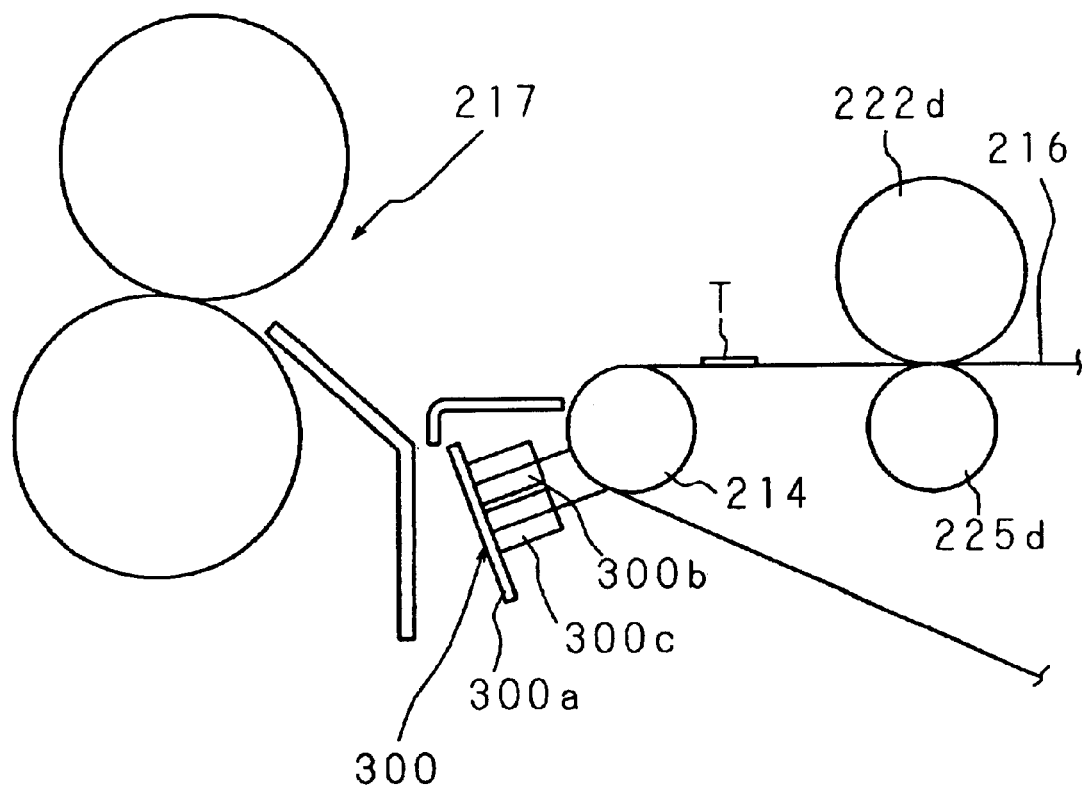
FIG. 2 is an enlarged fragmentary view of the digital color copying machine of FIG. 1.

FIG. 2 is an enlarged fragmentary view of the digital color copying machine 1 of FIG. 1.

The patch image detecting board unit 300 is arranged to oppose the transfer and transport belt 216 with a predetermined distance kept between the patch image detecting board unit 300 and the transfer and transport belt 216. An image density sensor provided at the patch image detecting board unit 300 detects the amount of toner adhering to a test toner image (toner patch image) T which is formed on the surface of the transfer and transport belt 216.

The patch image detecting board unit 300 is provided with a specular-reflection type sensor 300b and a diffuse-reflection type sensor 300c on a sensor circuit board 300a. Each of the specular-reflection type sensor 300b and the diffuse-reflection type sensor 300c is constituted of a known image density sensor having a light emitting device for emitting light onto a test toner patch image T and a light receiving device for detecting the reflection of light from the light emitting device. In this embodiment, the light emitting device is constituted of an infrared-emitting diode and the light receiving device is constituted of a photodiode.

The specular-reflection type sensor 300b emits light onto a black test toner patch image T and receives light specularly reflected at the test toner patch image T. The diffuse-reflection type sensor 300c emits light onto a color test toner patch image T and receives light diffusely reflected at the test toner patch image T.

Figure 3:
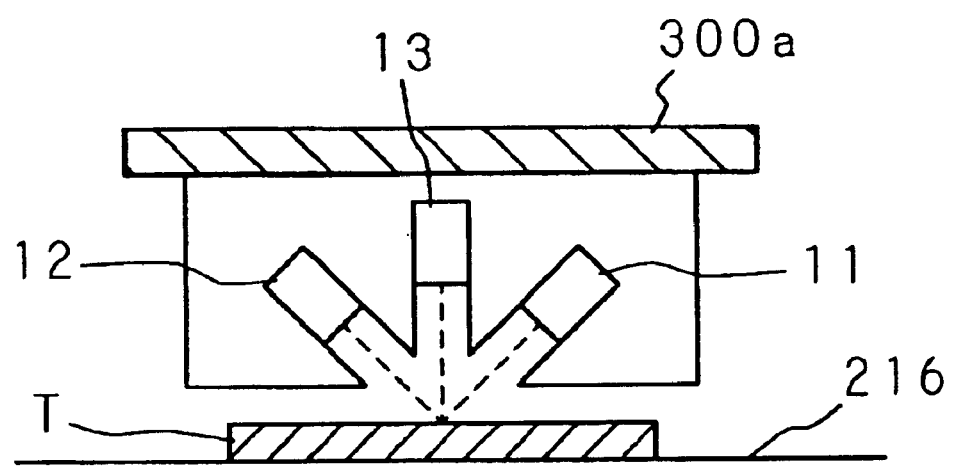
FIG. 3 is a sectional view showing another patch image detecting board unit.

One of usable image density sensors has, for example, a light emitting device (LED) 11 having a luminescence centre wavelength of 970 nm and two light receiving devices (photodiodes) 12 and 13 as shown in FIG. 3, wherein the light receiving device 12 (for specularly reflected light) is used for black toner and the light receiving device 13 (for diffusely reflected light) is used for color toner so that the image density sensor can detect both of a quantity of specularly reflected light and a quantity of diffusely reflected light. The image density sensor emits light from the LED 11 respectively to black and color test toner patch images T on the transfer and transport belt 216, receives specularly reflected light, the quantity of which corresponds to the image density of the black test toner patch image T, at the photodiode 12 and receives diffusely reflected light, the quantity of which corresponds to the image density of the color test toner patch image T, at the photodiode 13. The light which enters the photodiodes 12 and 13 generates a current depending on the quantity of received light. The current is converted into a voltage corresponding thereto, amplified and outputted as image density signals.

As described above, the image density sensor provided at the patch image detecting board unit 300 may have a specular-reflection type sensor and a diffuse-reflection type sensor which are separately provided or may have the sensors integrally formed.

Since a change in the distance between a test toner patch image T and the image density sensor causes a great change in a quantity of reflected light, extremely high accuracy is required in the distance between the above-described patch image detecting board unit 300 and the surface of the transfer and transport belt 216. Moreover, since high accuracy in the distance between the patch image detecting board unit 300 and the surface of the transfer and transport belt 216 is also required at the time of operation of the digital color copying machine 1 body, the patch image detecting board unit 300 is arranged at a position opposing the drive roller 214. With this arrangement, it is difficult to provide a calibration jig or a slidable calibration plate for calibrating the image density sensor.

Figure 4:
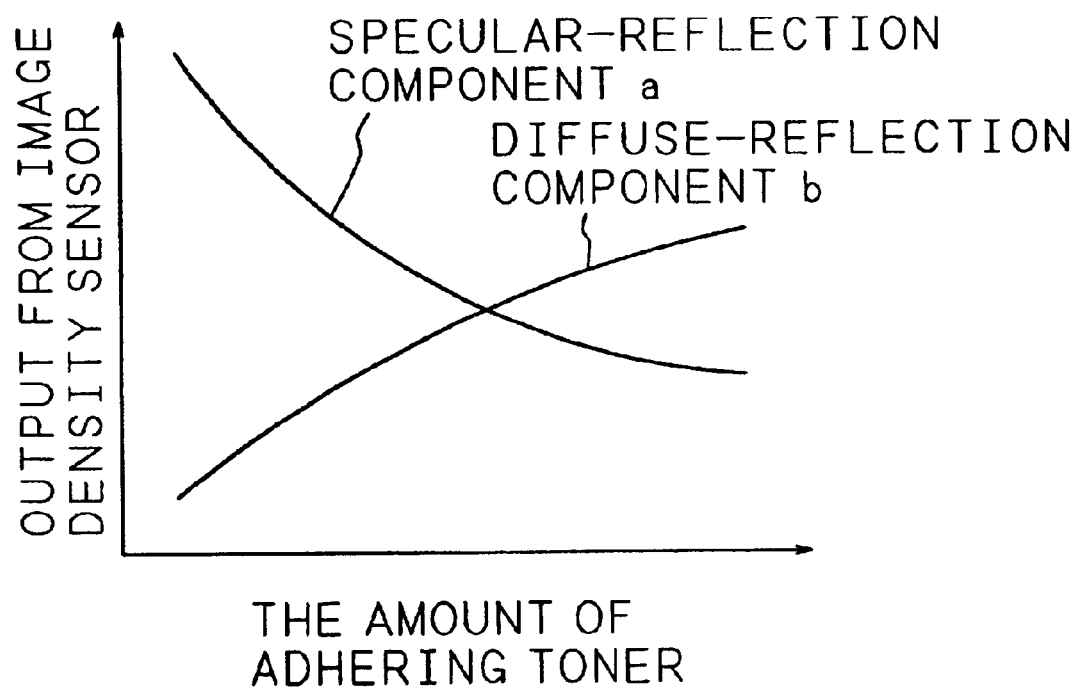
FIG. 4 shows a graph (specular-reflection light component "a") showing the relation between the amount of adhering color toner and an output from a specular-reflection type sensor, and a graph (diffuse-reflection light component "b") showing the relation between the amount of adhering color toner and an output from a diffuse-reflection type sensor.

FIG. 4 shows a graph (specular-reflection light component "a") showing the relation between the amount of adhering color toner and an output from the specular-reflection type sensor 300b, and a graph (diffuse-reflection light component "b") showing the relation between the amount of adhering color toner and an output from the diffuse-reflection type sensor 300c.

As shown in FIG. 4, the diffuse-reflection light component "b" tends to be saturated when the amount of adhering toner increases.

The digital color copying machine 1 according to this embodiment is of tandem type. Required for the digital color copying machine 1 of tandem type is to keep the image density of each color proper in order to obtain a high-quality full-color image. Consequently, the above-mentioned process control mode for setting a proper image density of each color is employed as well as a normal image formation mode.

In the process control mode, for example, electrostatic latent images of patches (patterns having a constant area of approximately 20 millimeter squares) are formed on the photoconductor drums 222a, 222b, 222c and 222d and then developed by a predetermined development contrast voltage. The obtained toner patch images of the respective colors are then transferred onto the transfer and transport belt 216 individually. The patch images of the respective colors which are formed on the transfer and transport belt 216 by transfer are transported to a downstream position of the transfer and transport belt 216 which has just passed the image forming station Pd of the fourth color, which is the last color. The patch image detecting board unit 300 arranged to oppose the transfer and transport belt 216 detects the image density (the amount of adhering toner) of the patch images.

Figure 5:
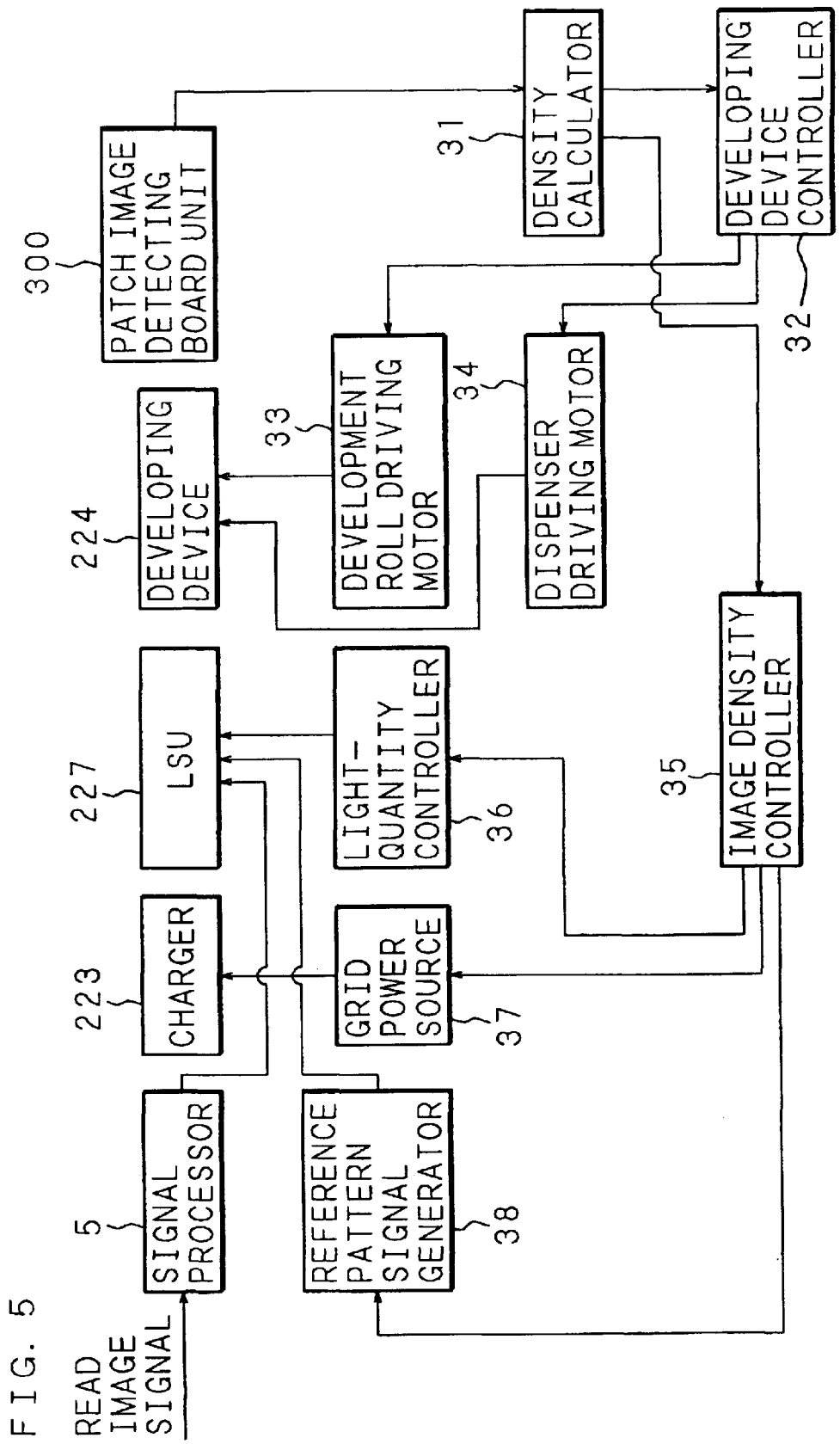
FIG. 5 is a block diagram of a control system of the digital color copying machine according to this embodiment.

FIG. 5 is a block diagram of a control system of the digital color copying machine 1 according to this embodiment.

Document image information (read image signals) which has been converted into electric signals by the CCD line sensor 116 is sent to a signal processor 5. The signal processor 5 processes image data and outputs the image data to the LSUs 227.

A density calculator 31 calculates a density signal outputted from the patch image detecting board unit (image density sensor) 300 (including both of the specular-reflection type sensor 300b and the diffuse-reflection type sensor 300c here) and outputs a corrected density signal without error. A developing device controller 32 inputs the corrected density signal and outputs a control signal for controlling conditions for development of the toner patch image. An image density controller 35 inputs the corrected density signal and outputs a control signal for controlling conditions for formation of an electrostatic latent image.

A development roll driving motor 33 inputs the control signal outputted from the developing device controller 32 and drives a developing controller of a developing device 224 to rotate at a predetermined speed. A dispenser driving motor 34 inputs the control signal outputted from the developing device controller 32 and controls the amount of toner supplied from a dispenser to the developing device 224 to be a predetermined amount.

A light-quantity controller 36 inputs the control signal outputted from the image density controller 35 and controls the quantity of laser beams emitted from the LSUs 227. A grid power source 37 inputs the control signal outputted from the image density controller 35 and applies voltage controlled by a grid of a (scorotron) charger 223. A reference pattern signal generator 38 inputs the control signal outputted from the image density controller 35 and generates a reference pattern signal for forming a color patch of, for example, 20 mm×20 mm on the photoconductor drums 222.

At the time of manufacturing or assembling and in shipment, an image density sensor is calibrated by using a jig including a calibration plate corresponding to a set amount of adhering toner in place of by reading toner patch images. That is, the specular-reflection type sensor 300b and the diffuse-reflection type sensor 300c detect the calibration plate and an output from (optical sensitivity of) each of the specular-reflection sensor 300b and the diffuse-reflection type sensor 300c is adjusted so that the detection value becomes a set value. Calibration is completed by adjusting a condition for conversion (resistance Ω) from a current generated by receiving light reflected at the calibration plate by the photodiode into a voltage and adjusting a gain for amplification after the conversion into a voltage so as to obtain a set output.

Moreover, an output (density signal output) from the image density sensor corresponding to the reflected light may be adjusted by adjusting an optical output from the image density sensor (adjusting a current value of the LED in the sensor).

Calibration of a sensor using the calibration plate makes it possible to regulate the relation between the image density (the amount of adhering toner) of a toner patch image and an output from the specular-reflection type sensor 300b and the diffuse-reflection type sensor 300c corresponding to the reflected light and to detect the image density precisely.

The result of the above-described calibration at the time of manufacturing and at the time of assembling is registered as a reference value. On the basis of the reference value, a target value of output from the specular-reflection type sensor 300b and the diffuse-reflection type sensor 300c corresponding to the reflected light to be used for adjusting (performing process control of) the image density of a toner patch image is set, and the target value is used in the following process control.

Figure 6:
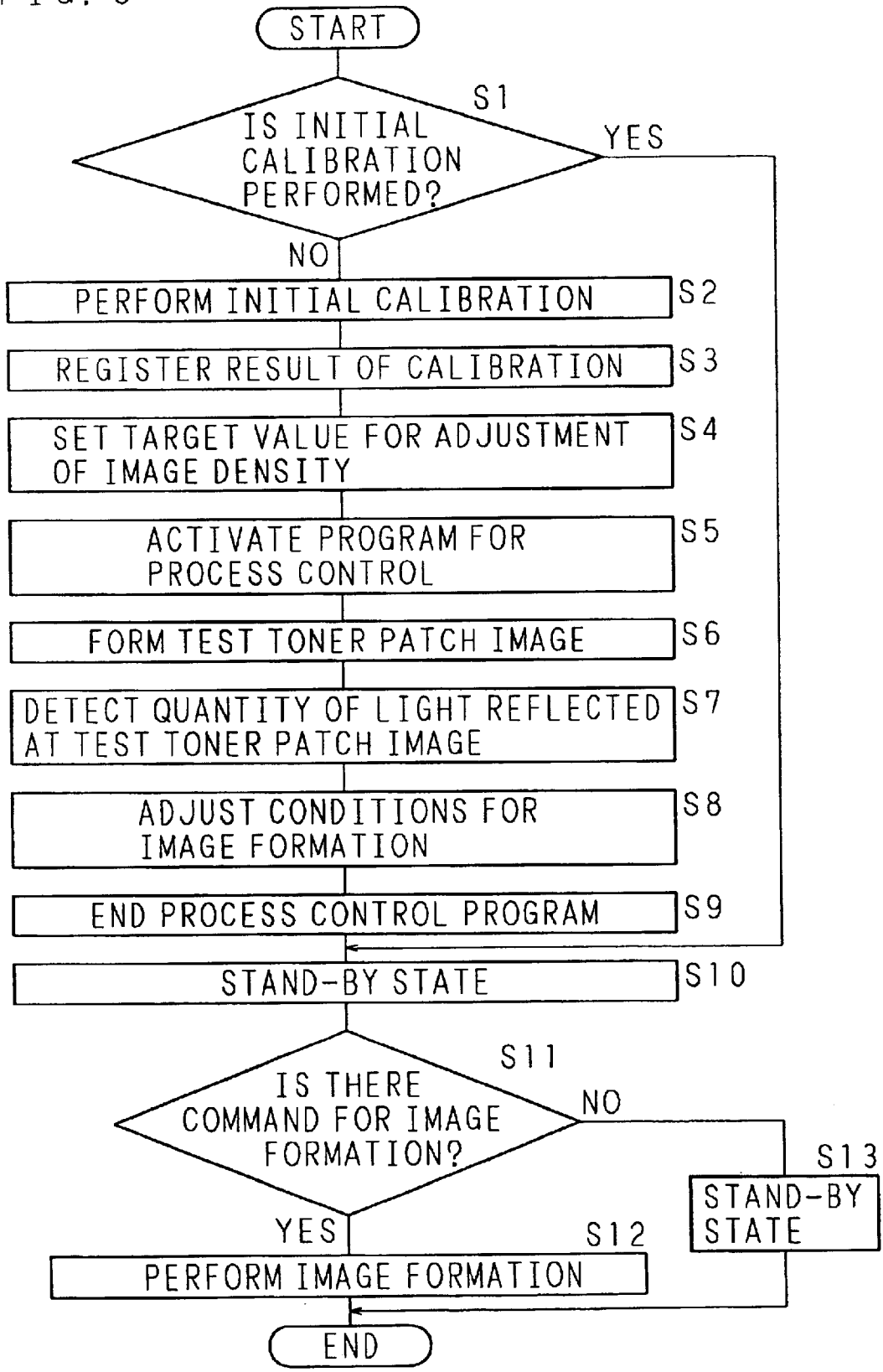
FIG. 6 is a flow chart showing processes of initial calibration and process control of an image density sensor of specular-reflection type and an image density sensor of diffuse-reflection type.

FIG. 6 is a flow chart showing processes of initial calibration and process control of the image density sensor of specular-reflection type 300b and the image density sensor of diffuse-reflection type 300c.

First, the image density controller 35 judges whether the result of initial calibration of a sensor in initial shipment is registered (initial calibration has been performed) or not (step S1). When the result of initial calibration of a sensor is not registered, the process goes to step S2, while when the result of initial calibration of a sensor is registered, the process goes to step S10.

When the result of initial calibration is not registered, initial calibration is performed using a calibration plate or a jig including a calibration plate. To put it more concretely, the quantity of light reflected at the calibration plate is detected and the optical sensitivity of a light receiving device of an image density sensor is adjusted so that the output corresponding to the reflected light becomes a pre-registered and set output (step S2).

The image forming apparatus registers the result of adjustment of the optical sensitivity, which is obtained by detecting light reflected at the calibration plate, as a reference value (step S3). On the basis of the registered reference value, a target value of output of the image density sensor corresponding to the reflected light for adjustment of the image density is set (step S4).

The image forming apparatus then activates a program for process control (step S5) and forms a test toner pattern (patch) image (step S6). A quantity of light reflected at the test toner patch image is then detected by the image density sensor (step S7), conditions for image formation are adjusted (step S8) and the process control program ends (step S9).

The image forming apparatus shifts to a stand-by state (step S10) and judges whether there is a command for image formation or not (step S11). When there is a command for image formation, the process goes to step S12, while when there is no command for image formation, the process goes to step S13.

When there is a command for image formation, an image forming operation is performed (step S12).

When there is no command for image formation, the image forming apparatus continues the stand-by state (step S13).

Figure 7:
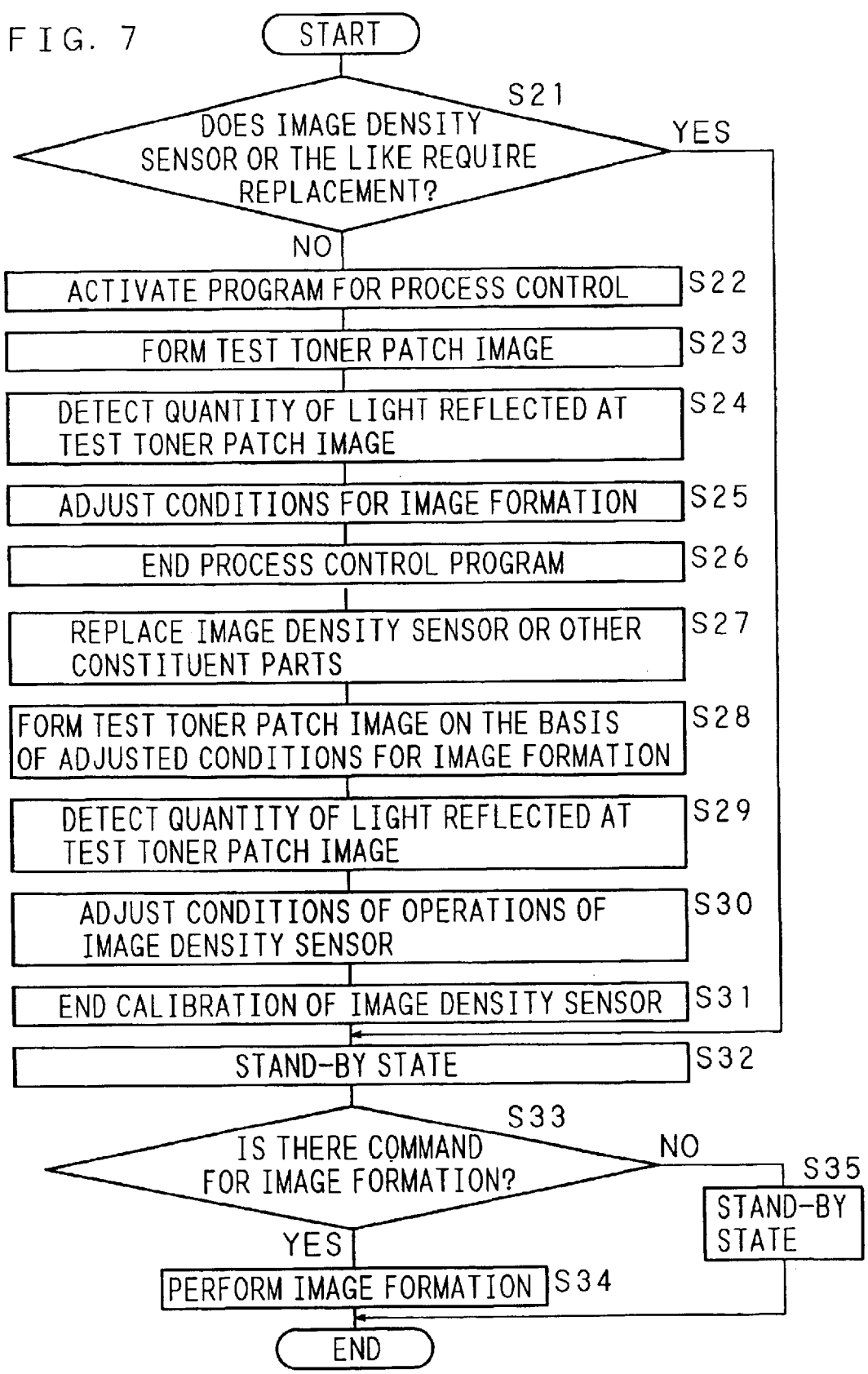
FIG. 7 is a flow chart showing processes of calibration of an image density sensor of specular-reflection type and an image density sensor of diffuse-reflection type at the time of replacement of constituent parts of an image forming section including an image density sensor.

FIG. 7 is a flow chart showing processes of calibration of an image density sensor of specular-reflection type 300b and an image density sensor of diffuse-reflection type 300c at the time of replacement of constituent parts of an image forming section 210 including an image density sensor.

When constituent parts of the image density sensor or of the image forming section 210 including the image density sensor after manufacturing or assembling and after shipment, it is also required to calibrate the image density sensor, i.e., to regulate the relation between the image density (the amount of adhering toner) of a toner pattern image and an output from the image density sensor corresponding to the reflected light, in order to detect the image density precisely.

First, the image density controller 35 judges whether any constituent part of the image density sensor or of the image forming section 210 including the image density sensor, e.g. a photoconductor drum 222, a transfer and transport belt 216 or a charger for transfer 225, requires replacement or not (step S21). It is judged that constituent parts of the image density sensor or of the image forming section 210 including the image density sensor require replacement when a preset number of sets have been copied or a predetermined rotation time of the transfer and transport belt 216 has passed or the like.

When any constituent part of the image density sensor or of the image forming section 210 including the image density sensor requires replacement, the process goes to step S22, while none of the constituent parts requires replacement, the process goes to step S32.

When any constituent part of the image density sensor or of the image forming section 210 including the image density sensor requires replacement, the image forming apparatus activates a process control program (step S22).

First, the image forming apparatus forms a test toner patch image (step S23) and detects the quantity of light reflected at the test toner patch image with the image density sensor (step S24). The image forming apparatus then adjusts conditions for image formation on the basis of an output from the image density sensor corresponding to the reflected light (step S25) and the program for process control ends (step S26).

The following description will explain regulation of the relation between an output from the image density sensor corresponding to the reflected light and conditions for image formation, which is performed in step S25.

Explained here is a case where a digital color copying machine 1 of tandem type as shown in FIG. 1 forms a test toner patch image on a transfer and transport belt 216, detects the image density of the test toner patch image and controls conditions for image formation.

First, before replacement of an image density sensor, a plurality of test toner patch images are formed on the transfer and transport belt 216 with a development bias voltage and/or a charging grid voltage varying in steps and light reflected at the test toner patch images are read by the image density sensor. (This is hereinafter referred to as Procedure 1.)

Next, on the basis of the development bias voltage and/or the charging grid voltage which has formed a plurality of toner patch images formed with different conditions in Procedure 1, a development bias voltage and/or a charging grid voltage required for forming a patch image which gives a predetermined sensor output (target output corresponding to the reflected light) is calculated. (This is hereinafter referred to as Procedure 2.)

Figure 8:
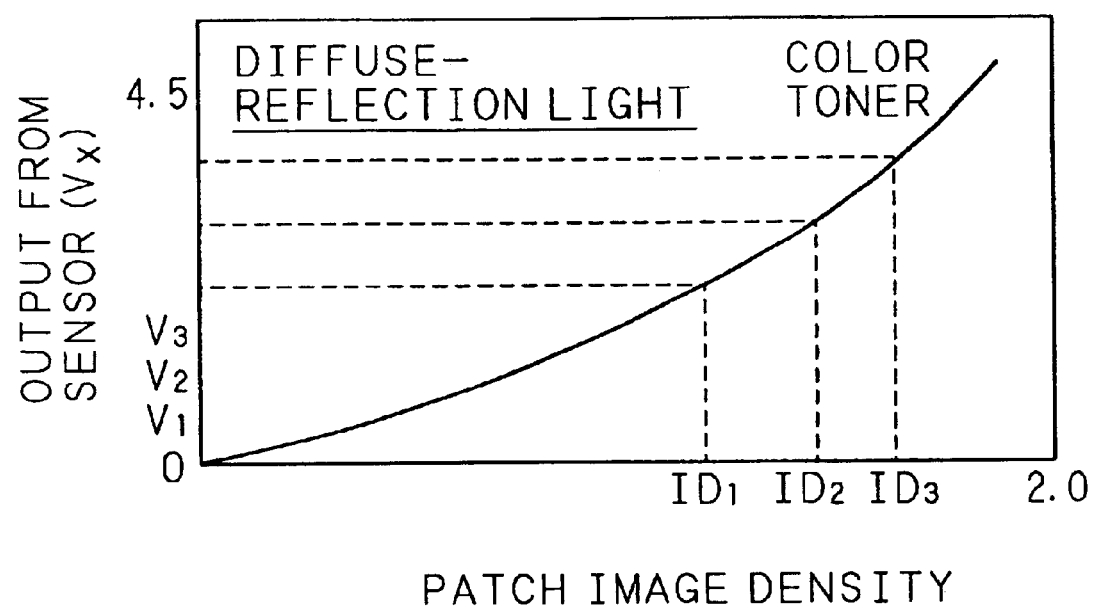
FIG. 8 is a graph showing the relation between an output $V_X$ from an image density sensor and a patch image density $ID_X$.

FIG. 8 is a graph showing the relation between an output $V_X$ from the image density sensor and a patch image density $ID_X$.

On the basis of this graph, the image forming apparatus calculates a development bias voltage $V_B$ and/or a charging grid voltage $V_G$ required for realizing a toner patch image having a patch image density $ID_X$ corresponding to a target sensor output $V_X$.

Since there is an interrelation between the patch image density $ID_X$ and the development bias voltage $V_B$ and/or charging grid voltage $V_G$, conditions for imaging which corresponds to the target sensor output can be calculated back.

Table 1 shows the relation among a patch image density $ID_X$, a sensor output $V_X$, a charging grid voltage $V_G$ and a development bias voltage $V_B$.

TABLE 1

| PATCH IMAGE DENSITY | SENSOR OUTPUT | CHARGING GRID VOLTAGE | DEVELOPMENT BIAS VOLTAGE |
|---|---|---|---|
| 0 (BARE BELT) | 0 (V) | — | — |
| $ID_1$ | $V_1$ | $V_{G1}$ | $V_{B1}$ |
| $ID_2$ | $V_2$ | $V_{G2}$ | $V_{B2}$ |
| $ID_3$ | $V_3$ | $V_{G3}$ | $V_{B3}$ |

Regarding the table 1, since it is understood in advance that the target sensor output arises at the proximity to any one of the voltages $V_1$ through $V_3$, a charging grid voltage $V_G$ and/or a development bias voltage $V_B$ corresponding thereto is calculated with quota share.

With respect to a black toner pattern or color toner patterns of subtractive three primary colors, the above process control may be performed for any one color or for all the colors.

As described above, the image forming apparatus completes the process control by deciding conditions for imaging (conditions for image formation) corresponding to the target sensor output $V_X$ (step S26).

Constituent parts of the image density sensor or of the image forming section 210 including the image density sensor are then replaced (step S27). A test toner patch image is then formed on the basis of conditions for image formation which are adjusted by the process control performed before replacement of the image density sensor (step S28).

A quantity of light reflected at a test toner patch image of a constant density, which is formed in step S28, is then detected by an image density sensor after replacement (step S29). Conditions of operations of the image density sensor are adjusted so that the sensor output (output corresponding to the reflected light) of step S29 is brought close to a preset reference value (target value) (step S30).

The following description will explain adjustment of conditions of operations of a sensor based on the sensor output of step S30.

Using the conditions for imaging which is decided in the Procedure 2, a test toner patch image is imaged on the transfer and transport belt 216 and the quantity of reflected light is detected by the image density sensor. The image density controller 35 adjusts the optical sensitivity of the image density sensor (adjusts a condition for conversion (resistance Q) for converting a current generated by receiving light by the photodiode in the image density sensor into a voltage, and/or a gain for amplification after the conversion into a voltage), or adjusts the optical output from the image density sensor (adjusts a current value of the LED in the sensor) so that an output from the image density sensor corresponding to the reflected light becomes a target value. It should be noted that, in order to obtain a target output corresponding to the reflected light, both of the output from the image density sensor corresponding to the received light and the optical output of the image density sensor may be adjusted, or only one of them may be adjusted. Moreover, when a black toner pattern or a color toner pattern of a plurality of colors is formed, adjustment of a specular-reflection type sensor for black toner and adjustment of a diffuse-reflection type sensor for a color toner pattern may be performed repeatedly.

Calibration of the image density sensor ends here (step S31).

The image forming apparatus then shifts to a stand-by state (step S32) and judges whether there is a command for image formation or not (step S33). When there is a command for image formation, the process goes to step S34, while when there is no command for image formation, the process goes to step S35.

When there is a command for image formation, operations for image formation are performed (step S34).

When there is no command for image formation, the image forming apparatus continues the stand-by state (step S35).

After adjusting conditions for image formation using an image density sensor which has been calibrated at the time of manufacturing and in shipment as described above, constituent parts of the image density sensor or of the image forming section 210 are replaced, a test toner patch image is formed using the adjusted conditions for image formation, the test toner patch image is detected by the image density sensor and conditions of operations of the image density sensor are adjusted.

As a result, at the time of replacement of an image density sensor or the like, calibration which prevents the occurrence of error in regulation of the relation between the image density (the amount of adhering toner) of a test toner patch image and a sensor output can be performed without using a calibration plate. Consequently, a proper and stable image density can be obtained even after replacement of an image density sensor. Moreover, since a black toner image and color toner images of subtractive three primary colors have a proper image density respectively, color balance can be held proper and a high-quality full-color image can be obtained.

As described, an image formation controlling method according to the present invention includes a calibration step of calibrating an image density sensor so that a detection value of image density of a toner pattern image, which is formed using the conditions for image formation controlled as above, becomes a predetermined reference value. This image formation controlling method does not require a calibration plate for calibrating the image density sensor, so that contamination of a standing calibration plate by toner does not occur.

An image density sensor can be calibrated easily and precisely after replacement of constituent parts of a digital color copying machine 1 including the image density sensor, so that the image density of a toner pattern image can be detected properly.

Consequently, by controlling conditions for image formation reliably, the image density of a toner pattern image can be held proper and a high-quality image can be realized.

Moreover, in the image formation controlling method according to this embodiment, the image density sensor is calibrated by adjusting the quantity of light emitted from the light emitting device or adjusting the optical sensitivity of the light receiving device, so that the image density sensor can be calibrated easily and with high accuracy.

It should be noted that, although the image density of a patch image is detected using the transfer and transport belt 216 in this embodiment, this invention is not limited to this. Alternatively, for example, the present invention can be applied to an image forming apparatus of indirect transfer type as shown in FIG. 9.

Figure 9:
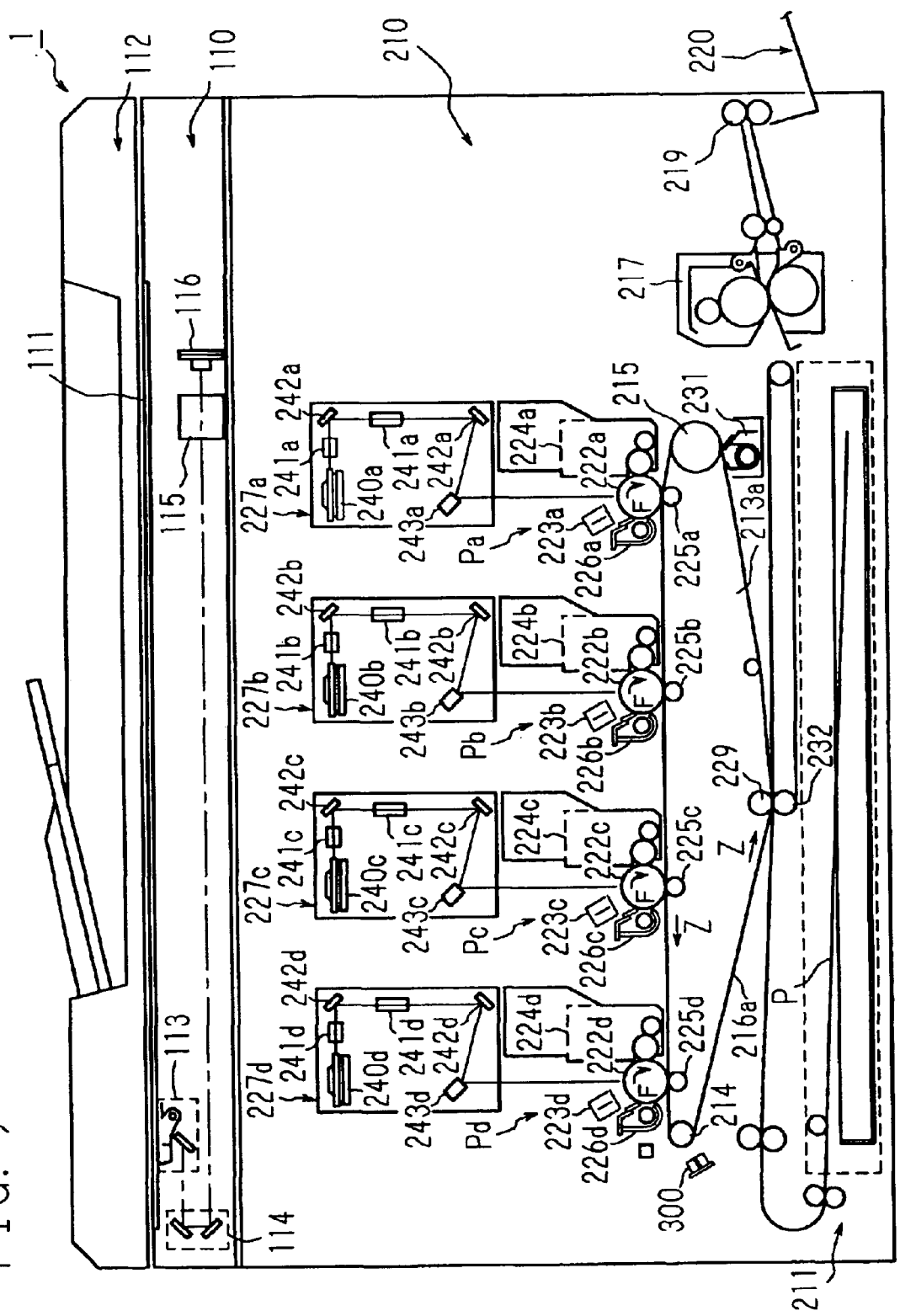
FIG. 9 is a schematic sectional front view showing the structure of a digital color copying machine according to another embodiment of the present invention.

Like codes are used to refer to like parts for an image informing apparatus in FIG. 9 and that in FIG. 1.

The image forming apparatus in FIG. 9 comprises a secondary transfer and transport belt mechanism 213a in place of the transfer and transport belt mechanism 213 in FIG. 1 and an intermediate transfer belt 216a in place of the transfer and transport belt 216 in FIG. 1. This image forming apparatus is constructed so that a toner image is formed (primary transfer) on a peripheral surface of the intermediate transfer belt 216a and the toner image is transferred (secondary transfer) onto a sheet P which is supplied to a position between a discharger for secondary transfer 232 and a roller 229 opposing the discharger for secondary transfer in predetermined timing. A test toner patch image T is then formed on the intermediate transfer belt 216a and the image density of the test toner patch image T is detected by the patch image detecting board unit 300.

Moreover, the patch image detecting board unit 300 may detect not the image density of a test toner patch image T which is transferred to the transfer and transport belt 216 or the intermediate transfer belt 216a but the image density of a test toner patch image T which is formed on the photoconductor drums 222.

Furthermore, although the above embodiment has explained a case where an image density sensor is calibrated after replacement of constituent parts of the image density sensor or of the image forming section 210, the present invention is not limited to this. Alternatively, an image density sensor may be calibrated when aging deterioration of performance of the image density sensor occurs or in predetermined timing. As a result, the image density of a toner pattern image can be always detected precisely, conditions for image formation can be controlled reliably and the image density of a toner pattern image can be held proper.

As this invention may be embodied in several forms without departing from the spirit of essential characteristics thereof, the present embodiments are therefore illustrative and not restrictive, since the scope of the invention is regulated by the appended claims rather than by the description preceding them, and all changes that fall within metes and bounds of the claims, or equivalence of such metes and bounds thereof are therefore intended to be embraced by the claims.

What is claimed is:

1. A method for controlling image formation using an image forming apparatus provided with a photoconductor for carrying an electrostatic latent image and an image density sensor, which has a light emitting unit and a light receiving unit, for detecting the image density of a toner pattern image obtained by developing the electrostatic latent image, comprising steps of:

forming an electrostatic latent image on the photoconductor by exposing the photoconductor, which is charged with electricity, to light;

emitting light, by the light emitting unit, onto a toner pattern image obtained by developing the electrostatic latent image;

detecting the image density of the toner pattern image by the image density sensor, by detecting the quantity of light reflected at the toner pattern image by the light receiving unit;

controlling at least one of conditions for image formation, which include a charging voltage for charging the photoconductor, a light exposure of the photoconductor, a development bias voltage to be applied for developing the electrostatic latent image and the amount of toner supplied for developing the electrostatic latent image, on the basis of the detected image density; and calibrating the image density sensor so that a detection value of image density of a toner pattern image, which is formed on the basis of the conditions for image formation controlled as above, becomes a predetermined reference value.

2. The image formation controlling method according to claim 1, further comprising steps of:

forming chromatic toner pattern images of subtractive three principle colors, respectively, on the basis of the conditions for image formation controlled as above; and calibrating the image density sensor so that detection values of image density of the toner pattern images respectively become reference values.

3. The image formation controlling method according to claim 2, wherein the detecting step includes a step of detecting the image density of a chromatic toner pattern image on the basis of the quantity of diffusely reflected light.

4. The image formation controlling method according to claim 1, wherein the detecting step includes a step of detecting the image density of an achromatic toner pattern image on the basis of the quantity of specularly reflected light.

5. The image formation controlling method according to claim 1, wherein the calibrating step includes a step of calibrating the image density sensor by adjusting the quantity of light emitted from the light emitting unit, which is provided at the image density sensor, for emitting light onto a toner pattern image.

6. The image formation controlling method according to claim 1, wherein the calibrating step includes a step of calibrating the image density sensor by adjusting the optical sensitivity of the light receiving unit, which is provided at the image density sensor, for receiving light emitted onto a toner pattern image.

7. The image formation controlling method according to claim 1, wherein the calibrating step is performed after replacement of at least one of constituent parts of the image forming apparatus including the image density sensor and the photoconductor.

8. A method for controlling image formation using an image forming apparatus provided with a photoconductor for carrying an electrostatic latent image, a transfer member for carrying a toner pattern image obtained by developing and transferring the electrostatic latent image and an image density sensor, which has a light emitting unit and a light receiving unit, for detecting the image density of the toner pattern image on the transfer member, comprising steps of:

forming an electrostatic latent image on the photoconductor by exposing the photoconductor, which is charged with electricity, to light;

emitting light, by the light emitting unit, onto a toner pattern image obtained by developing the electrostatic latent image and transferring the electrostatic latent image onto the transfer member;

detecting the image density of the toner pattern image by the image density sensor, by detecting the quantity of light reflected at the toner pattern image by the light receiving unit;

controlling at least one of conditions for image formation, which include a charging voltage for charging the photoconductor, a light exposure of the photoconductor, a development bias voltage to be applied for developing the electrostatic latent image, the amount of toner supplied for developing the electrostatic latent image and a transfer bias voltage to be applied for transferring the toner pattern image, on the basis of the detected image density; and calibrating the image density sensor so that a detection value of image density of a toner pattern image, which is formed on the basis of the conditions for image formation controlled as above, becomes a predetermined reference value.

9. An image forming apparatus comprising:

an electrostatic latent image forming unit for forming an electrostatic latent image on a photoconductor by exposing the photoconductor, which is charged with electricity, to light;

a toner pattern image forming unit for forming a toner pattern image by developing the electrostatic latent image;

an image density sensor, which includes a light emitting unit and a light receiving unit, for emitting light onto the toner pattern image, receiving light reflected at the toner pattern image, converting a current, which arises from the received light, into a voltage and detecting the image density of the toner pattern image on the basis of an amplified value;

an image formation condition controlling unit for controlling at least one of conditions for image formation, which include a charging voltage for charging the photoconductor, a light exposure of the photoconductor, a development bias voltage to be applied for developing the electrostatic latent image and the amount of toner supplied for developing the electrostatic latent image, on the basis of the detected image density; and an image density controlling unit for controlling the image density sensor so that a value of image density of the toner pattern image, which is formed on the basis of the conditions for image formation controlled as above, becomes a predetermined reference value, the image density controlling unit being capable of changing an optical output of the light emitting unit.

10. An image forming apparatus comprising:

an electrostatic latent image forming unit for forming an electrostatic latent image on a photoconductor by exposing the photoconductor, which is charged with electricity, to light;

a toner pattern image forming unit for forming a toner pattern image by developing the electrostatic latent image;

an image density sensor, which includes a light emitting unit and a light receiving unit, for emitting light onto the toner pattern image, receiving light reflected at the toner pattern image, converting a current, which arises from the received light, into a voltage and detecting the image density of the toner pattern image on the basis of an amplified value;

an image formation condition controlling unit for controlling at least one of conditions for image formation, which include a charging voltage for charging the photoconductor, a light exposure of the photoconductor, a development bias voltage to be applied for developing the electrostatic latent image and the amount of toner supplied for developing the electrostatic latent image, on the basis of the detected image density; and an image density controlling unit for controlling the image density sensor so that a value of image density of the toner pattern image, which is formed on the basis of the conditions for image formation controlled as above, becomes a predetermined reference value, the image density controlling unit being capable of performing at least one of:

changing a resistance to be used for converting a current, which arises from light reflected at the toner pattern image and received by the light receiving unit, into a voltage; and changing a gain to be used for amplification after converting the current into a voltage.

* * * * *